United States Patent [19]

Single, II et al.

[11] Patent Number: 5,385,382
[45] Date of Patent: Jan. 31, 1995

[54] COMBINATION SEAT FRAME AND VENTILATION APPARATUS

[75] Inventors: Arthur W. Single, II, Plymouth; Thomas J. Steiner, Washington; James J. Cristiano, Novi; Matthew J. Macek, Dearborn; Debra Yeager, Canton; Riad A. Farah, Northville, all of Mich.

[73] Assignee: Ford Motor Company, Dearborn, Mich.

[21] Appl. No.: 132,418

[22] Filed: Oct. 6, 1993

[51] Int. Cl.6 .................................................. A47C 7/74
[52] U.S. Cl. .................................................. 297/180.13
[58] Field of Search ........... 297/180.1, 180.13, 180.14, 297/452.2, 452.41

[56] References Cited

U.S. PATENT DOCUMENTS

| | | |
|---|---|---|
| 2,055,843 | 9/1936 | Helfinstine . |
| 2,782,834 | 5/1955 | Vigo . |
| 3,331,089 | 7/1967 | Ornas, Jr. et al. . |
| 3,486,177 | 12/1969 | Marshack ............ 297/180.13 X |
| 4,141,585 | 2/1979 | Blackman . |
| 4,549,766 | 10/1985 | Nishino ................ 297/391 X |
| 4,712,832 | 12/1987 | Antolini et al. . |
| 4,840,115 | 6/1989 | Johnson et al. . |
| 5,002,336 | 3/1991 | Feher .................. 297/180.13 |
| 5,102,189 | 4/1992 | Saito et al. ........... 297/180.14 |

FOREIGN PATENT DOCUMENTS 411375  2/1991  European Pat. Off. ........ 297/180.13

Primary Examiner—Peter R. Brown
Attorney, Agent, or Firm—Gregory P. Brown; Roger L. May

[57] ABSTRACT

A seat frame apparatus for a motor vehicle having a sealed duct capable of directing the flow of air while simultaneously supporting the structural loads imposed upon a conventional seat frame.

9 Claims, 2 Drawing Sheets

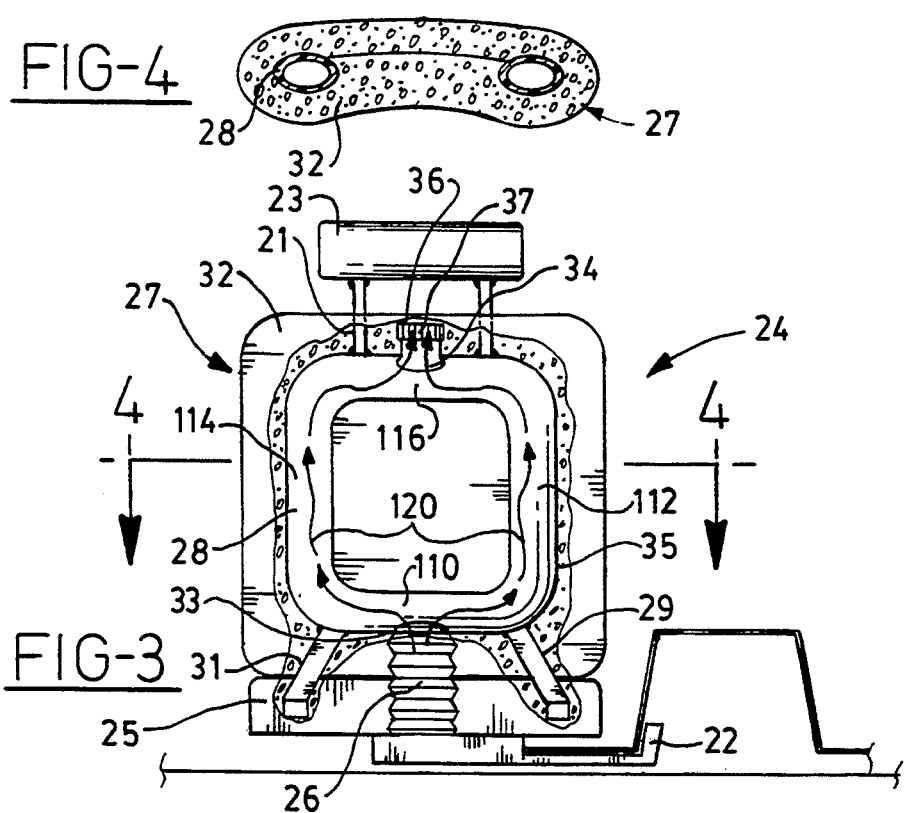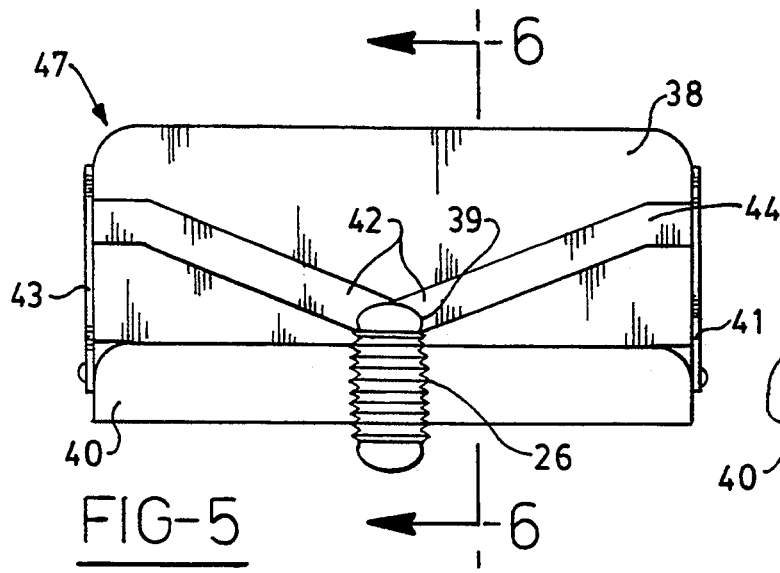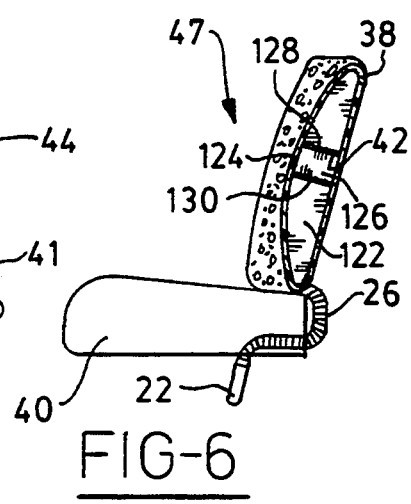

COMBINATION SEAT FRAME AND VENTILATION APPARATUS

BACKGROUND OF THE INVENTION

1. Field of the Invention

The present invention relates to seating systems for motor vehicles. More specifically, the present invention relates to a seat structure capable of performing the combined functions of structurally supporting seat loads and providing ducting for communicating air.

2. Disclosure Information

In a conventional motor vehicle, a climate control system regulates the temperature of the passenger compartment by regulating the air temperature. The system mixes conditioned air into the passenger compartment through a variety of vents. Strategic location of the vents can optimize the comfort of the passengers of the motor vehicle. Traditionally, the vents are located in the front of the passenger compartment, typically on the instrument panel.

Passenger comfort has been further improved by the use of multiple vents throughout the passenger compartment. As shown in U.S. Pat. Nos. 2,055,843 and 4,840,115, vents have been strategically located on the backside of a seat back of a passenger seat. This principle allows the dispersion of conditioned air directly into the rear passenger seating area in immediate proximity of the rear passengers. However, these systems require air ducts to be added to the seat back. These air ducts present a substantial obstacle to providing a cost efficient design satisfactory for mass production. For instance, seats designed in accordance to either the '843 or the '115 patents require additional internal package space for placement of the duct. Often this additional space limitation conflicts with other vehicle and seat design objectives. Also, the additional steps required to install the air duct in the seat back reduces the feasibility of mass producing this feature. Additionally, installing the air duct into the seat back increases the complexity of the assembly process. During installation, a variety of fasteners must be used to secure the air duct to the seat structure to prevent squeak and rattle problems. Finally, the air duct adds additional weight to the seat. Each of these problems has heretofore been unsolved.

It would be desirable to have a seating system capable of performing the combined functions of structural support and providing an air passage through the seat back to a vent to improve the effectiveness of the climate control system while substantially reducing the cost, weight, bulk and complexity associated with previous systems.

SUMMARY OF THE INVENTION

The present invention advances beyond the systems described above by providing a seat for a passenger compartment of a motor vehicle having a source of conditioned air under pressure. The seat comprises a seat base secured to the motor vehicle within the passenger compartment, a seat back having a rearward facing surface and a seat back frame. The seat back frame includes an inlet in communication with the source of conditioned air, an outlet in communication with the passenger compartment, and a tubular portion fluidly interconnecting the inlet to the outlet in a substantially sealed relationship. Additionally, the seat includes support means for securing said seat base to said seat back frame.

It is an advantage of the present invention to provide a seat back air duct system with minimal additional parts, thereby reducing costs and complexity of incorporating such a desirable system into a motor vehicle climate control system.

Other objects, features and advantages of the present invention will become apparent to those skilled in the art from the drawings, detailed description and claims which follow.

BRIEF DESCRIPTION OF THE DRAWINGS

FIG. 3 is a rearview of a seat for a motor vehicle designed in accordance with the present invention.

FIG. 4 is a cross-sectional view along line 4—4 of FIG. 3

FIG. 5 is a rear view of an alternative embodiment of a seat for a motor vehicle designed in accordance with the present invention.

FIG. 6 is a cross-sectional view along line 6—6 of FIG. 5.

DETAILED DESCRIPTION OF THE PREFERRED EMBODIMENTS

Figure 1:
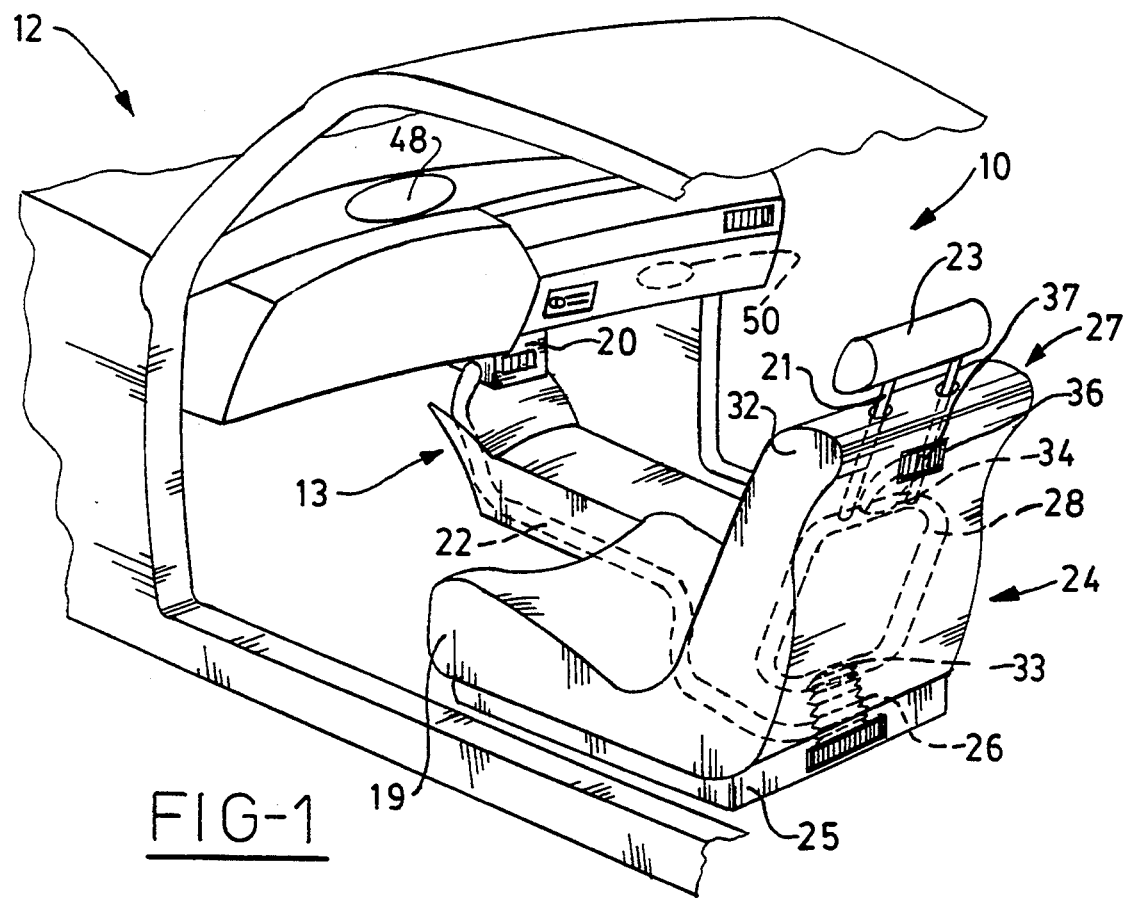
FIG. 1 is a perspective view of a passenger seat installed in a motor vehicle passenger compartment in accordance with the present invention.

Referring now to FIG. 1, a passenger compartment 10 of a motor vehicle 12 includes an automotive seat assembly 14 having a seat base 16, a seat cushion 18 thereon, a seat back including a seat back frame 22, a seat back cushion 24, a headrest frame 26, and a headrest 28. The seat assembly 14 mounts on a slidable frame (not shown) to allow fore and aft adjustment of the seat assembly 14. The slidable frame is secured to a portion of the vehicle body 12 within the passenger compartment 10. A climate control system 30 provides the seat assembly 14 with conditioned air.

Figure 2:
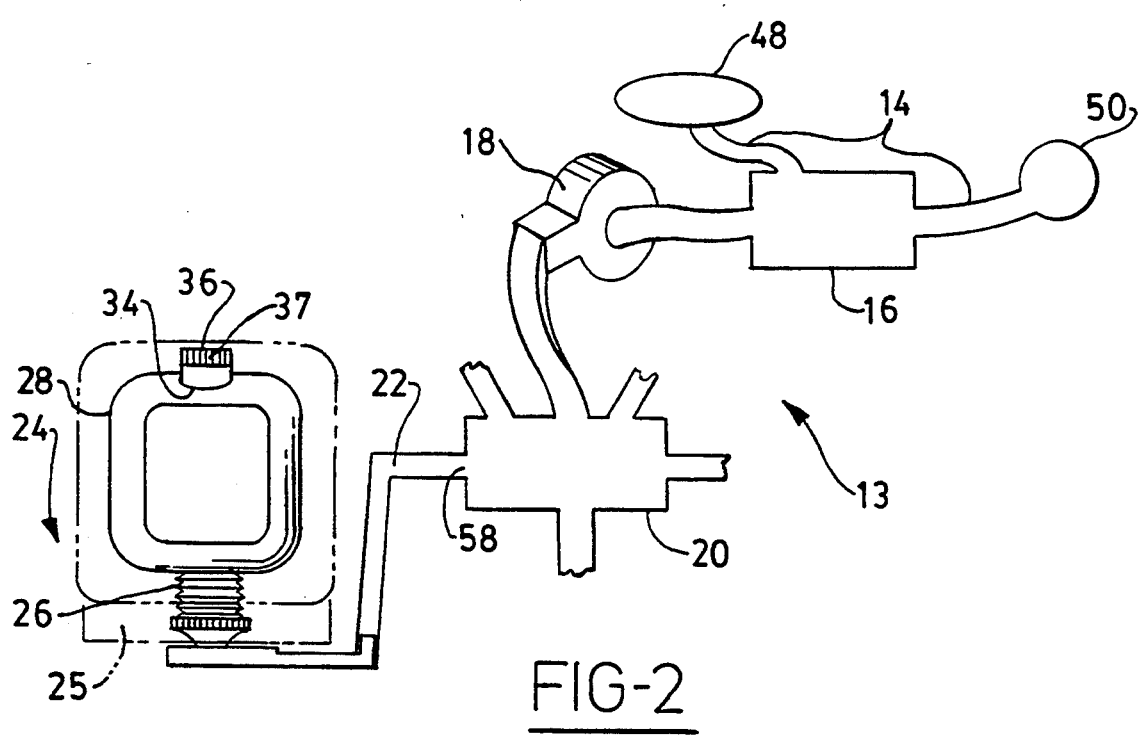
FIG. 2 is schematic illustration showing a view of a climate control system contemplated for use with a seat designed in accordance with the present invention.

FIG. 2 schematically illustrates the climate control system 30 components and their interrelationship with the seat assembly 14. The climate control system 30 may include a cowl inlet 21, a recirculation inlet 32, an intake plenum 33, a heat exchanger 34, a squirrel cage blower 36, and an air distribution manifold 38. A noncollapsible duct 40 extends from an exhaust port 39 on the manifold 38 rearwardly to the underside of the seat assembly 14. A flexible duct 42 interconnects, in a sealed relationship, the noncollapsible duct 40 to the seat back frame 28.

As is further illustrated in FIGS. 3 and 4, the seat back 20 includes the seat back cushion 24 supported on the integral seat back frame 22. The seat back frame 22 consists of supports 44 and 46, armature 48, and headrest frame 26. The headrest frame 26 attaches to the upper horizontal portion of the armature 48 of the seat back frame 22 and extends upward to support a headrest 28. Armature 48 forms the central portion of seat back frame 22 and provides the primary load support for seat back cushion 24 by direct attachment of the seat base through supports 44 and 46. Armature 48 may include an elongate, lower horizontal portion 50, having an inlet 52 located substantially midway between the ends of horizontal portion 50. Armature 48 may further include a right vertical portion 54 and a left vertical portion 56 extending from the ends of lower horizontal portion 50 upward to an elongate, upper horizontal portion 58. Upper horizontal portion 58 interconnects right vertical portion 54 and left vertical portion 56. Upper horizontal portion 58 has an outlet 60 located substantially midway between the ends of upper horizontal portion 58. These portions of armature 48 are interconnected to form a substantially sealed duct creating a conduit for communicating air from the inlet 52 to the outlet 60 as indicated by arrows 62. As described and shown, the armature 48 forms substantially a square-nonplanar polygon. The present invention is not so limited, and encompasses many planar and nonplanar polygonal shapes, as primarily dictated by the exterior shape of the seat back 20.

Substantially all of the seat back loads are supported by armature 48 and are directly transmitted to the seat base 16 by right support 44 and left support 46. Right support 44 attaches to armature 48 generally at the intersection of right vertical portion 54 and lower horizontal portion 50. Similarly, left support 46 attaches to armature 48 generally at the intersection of the left vertical portion 56 and the lower horizontal portion 50. The supports may be replaced by reclining mechanisms to allow the seat back 20 to tilt relative to the seat base 16.

FIG. 4 illustrates a sectional view cut through seat back 20 illustrating the armature 48 having a substantially sealed tubular cross section for communicating air in accordance with the present invention. Armature 48 may be constructed of stamped electrocoated steel, or similar corrosion resistant material. The cross section is substantially closed and may be constructed from two stampings joined by spot welding, riveting or snapfitting. Alternatively, the tubular portions of the seat back frame 22 could be formed by drawing the steel over a mandrel. Constructed according to one of these techniques, the armature 48 provides air communication from the inlet 52 through the duct formed by the tubular portions of the armature 48 to the outlet 60.

The outlet 60 of the seat back frame 22 communicates air to a vent 64 positioned to discharge air into the upper stratum of the passenger compartment 10. Vent 64 may have articulating vanes 66 to adjustably direct the airflow to provide maximum passenger comfort. Typically, the vent housing is rotatable about one of two axes forming the plane of the vent opening and the vanes are adjustable about the mutually perpendicular axis.

FIG. 5 illustrates an alternative embodiment of the present invention. A bench seat back frame 68 is pivotally mounted to a bench seat base 70 with a right seat back support 72 and a left seat back support. Seat back frame 68 is preferably of a blow molded synthetic polymeric material, such as polypropylene, having internal walls for providing the dual functions of structural support and communicating airflow through the seat back frame 68. As shown in FIG. 5, a seat having flexible duct 42 interconnects seat back duct 76 at inlet 78 to a supply of conditioned air as disclosed in the previously described embodiment. Air is communicated through seat back duct 76 to an outlet 80 located on the seat back 82.

As can be seen in FIG. 6, the duct 76 is formed within a cavity 84 bounded by the joining of a forward facing wall 86 and a rearward facing wall 88 of the seat back frame. An upper wall 90 extends substantially perpendicularly between the forward facing wall 86 and the rearward facing wall 88, together with a lower wall 92 disposed between and substantially perpendicular to the forward facing wall 86 and the rearward facing wall 88 in a sealed relationship forming a closed duct 76. This design provides a substantially sealed duct 76 which acts as a conduit for communicating air from an inlet 78 to an outlet 80. The seat back frame 68 may be constructed in a conventional manner from synthetic polymeric material.

Operation of a climate control system according to the present invention will be described with reference to previously described FIGS. 1 and 2. The squirrel cage blower 36 draws air either through cowl inlet 31 or recirculation inlet 32 into intake plenum 33. The squirrel cage blower 36 pressurizes the air sufficiently to cause it to flow throughout the system. The air passes through the heat exchanger 34 on its way to manifold 38. Upon selection by the vehicle operator as known in the art, the manifold 38 directs the air through exhaust port 39. This air then passes through noncollapsible duct 40, through flexible duct 42 into seat back frame 22 at inlet 52, upward and out of the seat armature 48 through outlet 60, and finally through vent 64 into the upper stratum of the passenger compartment 10.

This seating system represents a substantial improvement over the prior art systems utilizing conventional seat back frame combined with separate ducting. Seat back frames constructed in accordance with the present invention combines these functions into a single unit. This results in simplified manufacturing, reduced cost, weight and complexity by completely eliminating the previously required separate duct in the seat back.

Various other modifications and permutations of the present invention should, no doubt, occur to those skilled in the art. For example, there might be multiple outlets disposed at a variety of vertical positions on the seat back frame to provide additional mixing options. Alternatively, the system may be also used to communicate air from one side of the vehicle to the other. The system may be designed to work with an air conditioning system utilizing a peltier thermal device. Therefore, it is the following claims, including all equivalents, which define the scope of the invention.

We claim:

1. An occupant seating apparatus for a passenger compartment of a motor vehicle having a source of conditioned air under pressure, said apparatus comprising:
    a seat base secured to said motor vehicle within said passenger compartment;
    a seat back having a rearward facing surface;
    a seat back frame;
    an inlet disposed on a lower portion of said seat back frame, said inlet being in communication with said source of conditioned air;
    an outlet disposed on an upper portion of said seat back frame, said outlet being in communication with said passenger compartment;
    a tubular portion of said seat back frame fluidly interconnecting said inlet to said outlet in a substantially sealed relationship, said tubular portion comprising:
        a horizontal lower portion having a first end and a second end, said inlet being disposed substantially midway between said first and second ends;
        a right vertical portion having a right lower end and a right upper end, said right lower end fluidly joined to said first end of said lower horizontal portion in a sealed relationship;

a left vertical portion having a left lower end and a left upper end, said left lower end fluidly joined to said second end of said lower horizontal portion in a sealed relationship; and a horizontal upper portion having a third end fluidly joined to said right upper end in a sealed relationship and a fourth end fluidly joined to said left upper end in a sealed relationship, said outlet being disposed substantially midway between said third and fourth ends; and support means for securing said seat back frame to said seat base.

2. A seating apparatus according to claim 1, wherein said tubular portion is generally polygonal in shape and adapted to allow fluid flow therethrough.

3. A seating apparatus according to claim 1, wherein said seat back frame is a synthetic polymer.

4. A seating apparatus according to claim 1, wherein said support means further comprises:

a right support directly connecting a right side of said seat base to a right side of said seat back frame; and a left support directly connecting a left side of said seat base to a left side of said seat back frame, said left and right support operative to provide the primary load support of said seat back.

5. A seating apparatus according to claim 1, further comprising an articulating vent disposed on said rearward facing surface of said seat back and fluidly connected to said outlet, said vent being adapted to direct a stream of conditioned air into an upper stratum of air within the passenger compartment.

6. A seating apparatus according to claim 1, wherein said seat back further comprises:

a headrest frame directly attached to said seat back frame; and a headrest secured to said headrest frame.

7. An occupant seating apparatus for a passenger compartment of a motor vehicle having a source of conditioned air under pressure, said apparatus comprising:

a seat base secured to said motor vehicle within said passenger compartment;

a seat back having a rearward facing surface;

a seat back frame;

an inlet disposed on a lower portion of said seat back frame, said inlet being in communication with source of conditioned air;

an outlet disposed on an upper portion of said seat back frame, said outlet being in communication with said passenger compartment;

a tubular portion of said seat back frame fluidly interconnecting said inlet to said outlet in a substantially sealed relationship, said tubular portion comprising:

a horizontal lower portion having a first end and a second end, said inlet being disposed substantially midway between said first and second ends;

a right vertical portion having a right lower end and a right upper end, said right lower end fluidly joined to said first end of said lower horizontal portion in a sealed relationship;

a left vertical portion having a left lower end and a left upper end, said left lower end fluidly joined to said second end of said lower horizontal portion in a sealed relationship; and a horizontal upper portion having a third end fluidly joined to said right upper end in a sealed relationship and a fourth end fluidly joined to said left upper end in a sealed relationship, said outlet being disposed substantially midway between said third and fourth ends;

a right support directly connecting a right side of said seat base to a right side of said seat back frame;

a left support directly connecting a left side of said seat base to a left side of said seat back frame, said left and right support operative to provide the primary load support of said seat back;

a headrest frame directly attached to said seat back frame; and a headrest secured to said headrest frame.

8. A seating apparatus according to claim 7, further comprising an articulating vent disposed on said rearward facing surface of said seat back and fluidly connected to said outlet, said vent being adapted to direct a stream of conditioned air into an upper stratum of air within the passenger compartment.

9. An occupant seating apparatus for a passenger compartment of a motor vehicle having a source of conditioned air under pressure, said apparatus comprising:

a seat base secured to said motor vehicle within said passenger compartment;

a seat back having a rearward facing surface;

a seat back frame including:

an inlet in communication with said source of conditioned air;

an outlet in communication with said passenger compartment;

a horizontal lower portion having a first end and a second end said inlet being disposed substantially midway between said first and second ends;

a right vertical portion having a right lower end and a right upper end, said right lower end fluidly joined to said first end of said lower horizontal portion in a sealed relationship;

a left vertical portion having a left lower end and a left upper end, said left lower end fluidly joined to said second end of said lower horizontal portion in a sealed relationship; and a horizontal upper portion having a third end fluidly joined to said right upper end in a sealed relationship and a fourth end fluidly joined to said left upper end in a sealed relationship said outlet being disposed substantially midway between said third and fourth ends;

a right support directly connecting a right side of said seat base to a right side of said seat back frame;

a left support directly connecting a left side of said seat base to a left side of said seat back frame, said left and right support operative to provide the primary load support of said seat back;

a headrest frame directly attached to said seat back frame;

a headrest secured to said headrest frame; and an articulating vent disposed on said rearward facing surface of said seat back and fluidly connected to said outlet, said vent being adapted to direct a stream of conditioned air into an upper stratum of air within the passenger compartment.

* * * * *